UNITED STATES PATENT OFFICE.

JOSEPH J. BENTZ, OF LOS ANGELES, CALIFORNIA, ASSIGNOR TO KEYSTONE FILM COMPANY, OF LOS ANGELES, CALIFORNIA, A CORPORATION.

PROCESS OF MANUFACTURE OF ARTICLES FROM PLASTER OF PARIS.

1,221,130.          Specification of Letters Patent.      Patented Apr. 3, 1917.

No Drawing.      Application filed November 1, 1915.    Serial No. 59,074.

*To all whom it may concern:*

Be it known that I, JOSEPH J. BENTZ, who was born in Austria and has declared his intention of becoming a citizen of the United States, residing at the city of Los Angeles, in the county of Los Angeles and State of California, have invented new and useful Improvements in the Process of the Manufacture of articles from Plaster of Paris and in a Coating Compound, of which the following is a specification.

In the production of films for moving pictures it frequently happens that the scenario call for scenes in which household articles such as plates, saucers, cups, pitchers and other articles are broken. Sometimes these articles are broken over the heads of the actors. It therefore becomes necessary that a very inexpensive and a very fragile article must be used. It is the object of my invention to produce such articles.

In carrying out my process I first prepare a mold, preferably of plaster Paris, I then shellac the interior of the mold if made of plaster Paris or other absorbent material. After the shellac is dry I coat the mold with a coating compound composed of equal parts of stearic acid and linseed oil, mixed while the acid is hot. If the coating compound does not flow readily when cold it may be thinned with coal oil or distillate produced in the reduction of crude petroleum so that it will flow readily. I then mix plaster Paris with water until it reaches the consistency of running cream of medium consistency. I then pour the plaster Paris into the mold. Before it sets I pour the plaster Paris out of the mold. A thin film of plaster Paris clings to the walls of the mold and as soon as this sets slightly I again fill the mold with plaster Paris and pour it out. This process is repeated until the article desired possesses walls of the desired thickness.

If the desired article is to be a colored article coloring matter consisting of anilin dyes is mixed with the plaster Paris before it is poured. Should it be desired that the vessel thus produced shall contain a liquid the interior is shellacked.

In making hollow vessels like pitchers or bottles I prefer to make the mold in three parts. For intricate articles the mold is made of many parts.

If the mold is made of non-absorbent material the interior need not be shellacked.

Having described my invention what I claim is:

1. The herein described process of making articles from plaster Paris which consists of first preparing a mold, then coating the interior of the mold with a coating compound composed of equal parts of stearic acid and linseed oil, then preparing plaster Paris with water to the consistency of flowing cream, then pouring the plaster Paris into the mold and out again, then repeating the pouring of the plaster Paris until the desired thickness of material has set on the mold and then removing the mold.

2. The herein described process of making articles from plaster Paris which consists of first preparing a mold, then coating the interior of the mold with a coating compound composed of equal parts of stearic acid and linseed oil, diluted with a suitable thinner, then preparing plaster Paris and a suitable coloring matter with water to the consistency of flowing cream, then pouring the plaster into the mold and out again, then repeating pouring of the plaster Paris until the desired thickness of material has set on the mold and then removing the mold.

3. The herein described process of making articles from plaster Paris which consists of first preparing a mold of the desired shape; then coating the interior with a compound that will prevent liquid plaster Paris from permanently adhering to the same; then repeatedly pouring liquid plaster Paris into and out of the mold until the desired thickness of material has set on the mold; and then removing the mold.

In witness that I claim the foregoing I have hereunto subscribed my name.

JOSEPH J. BENTZ.

Copies of this patent may be obtained for five cents each, by addressing the "Commissioner of Patents, Washington, D. C."